(12) United States Patent
Cudney (10) Patent No.: US 9,376,132 B1
(45) Date of Patent: Jun. 28, 2016

(54) CAR DOLLY AND METHODS OF MAKING AND USING SAME

(71) Applicant: MVP (H. K.) Industries Limited, Kowloon (HK)

(72) Inventor: Derek Ryan Cudney, Prairie Village, KS (US)

(73) Assignee: MVP (H.K.) INDUSTRIES LIMITED, Kowloon (HK)

( * ) Notice: Subject to any disclaimer, the term of this patent is extended or adjusted under 35 U.S.C. 154(b) by 0 days.

(21) Appl. No.: 14/752,276

(22) Filed: Jun. 26, 2015

(51) Int. Cl.
  *B60B 30/10* (2006.01)
  *B62B 3/16* (2006.01)
(52) U.S. Cl.
  CPC ........................................ *B62B 3/16* (2013.01)
(58) Field of Classification Search
  CPC .. B60B 30/10; B60B 29/002; B60B 33/0002; B60B 30/02; B62B 3/16; B62B 5/00
  See application file for complete search history.

(56) References Cited

U.S. PATENT DOCUMENTS

| | | | | |
|---|---|---|---|---|
| 3,836,027 A | * | 9/1974 | Gardner | B60B 29/002 254/10 R |
| 5,464,076 A | * | 11/1995 | Benedetto, Jr. | B60P 3/077 188/32 |
| 5,732,960 A | * | 3/1998 | Elam | B60B 29/002 254/113 |
| 6,390,759 B1 | * | 5/2002 | Novak | B62B 5/049 188/5 |
| 6,863,488 B2 | * | 3/2005 | Chopra | B60B 33/0002 280/79.4 |
| 8,006,984 B2 | | 8/2011 | Chubb | |
| 8,567,795 B2 | | 10/2013 | Megens | |
| 8,740,228 B2 | | 6/2014 | Patterson et al. | |
| 2014/0037409 A1 | * | 2/2014 | Winters | B60B 30/02 414/427 |
| 2014/0175765 A1 | | 6/2014 | Tiilikainen et al. | |

* cited by examiner

*Primary Examiner* — Hau Phan
(74) *Attorney, Agent, or Firm* — Lathrop & Gage LLP (57) ABSTRACT

A car dolly comprises a frame having a supporting portion and a tire receiving portion. The supporting portion has a plurality of wheel acceptance areas. The tire receiving portion comprises a pair of angled inner walls and a pair of outer walls. The dolly has a pair of rotatable arms and a reversible saddle. In an extended configuration, each rotatable arm extends above the frame at an angle. In a retracted configuration, each rotatable arm extends generally horizontally underneath the frame.

20 Claims, 7 Drawing Sheets

CAR DOLLY AND METHODS OF MAKING AND USING SAME

FIELD OF THE INVENTION

The invention relates generally to the field of dollies. More specifically, the invention relates to the field of stackable car dollies.

SUMMARY

Systems and methods of making and using car dollies are disclosed herein. According to an embodiment, a stackable car dolly comprises a frame having a supporting portion and a tire receiving portion. The supporting portion supports the tire receiving portion and has a plurality of wheel acceptance areas. The tire receiving portion includes a pair of angled inner walls and a pair of outer walls. The dolly further comprises a pair of rotatable arms, and a reversible saddle. The reversible saddle has a frame rail member and a pinch weld member opposing the frame rail member. In an extended configuration, each rotatable arm extends above the frame at an angle. In a retracted configuration, each rotatable arm extends underneath the frame.

According to another embodiment, a method of placing a dolly from an extended position to a retracted position comprises the step of providing the dolly. The dolly comprises a frame having a supporting portion and a tire receiving portion. The dolly includes a first rotatable arm and a second rotatable arm. The dolly further comprises a first holding portion and a second holding portion. The first rotatable arm is pivotably connected to the first holding portion and the second rotatable arm is pivotably connected to the second holding portion. The dolly includes a reversible saddle. The method comprises the step of uncoupling each of the first rotatable arm and the second rotatable arm from the saddle. The method further includes the step of causing each of the first rotatable arm and the second rotatable arm to rotate underneath the frame. The method also includes the step of using at least one locking member to lock with respect to the frame each of the first rotatable arm, the second rotatable arm, and the saddle.

According to yet another embodiment, a car dolly comprises a frame having a supporting portion and a tire receiving portion. The supporting portion has a plurality of wheel acceptance areas. The tire receiving portion comprises a pair of angled inner walls and a pair of outer walls. The dolly has a pair of rotatable arms, and a reversible saddle. In an extended configuration, each rotatable arm extends above the frame at an angle. In a retracted configuration, each rotatable arm extends generally horizontally underneath the frame.

BRIEF DESCRIPTION OF THE SEVERAL VIEWS OF THE DRAWINGS

Illustrative embodiments of the present invention are described in detail below with reference to the attached drawing figures and wherein.

DETAILED DESCRIPTION

In the automotive industry, it is often necessary to service vehicles—such as for repair or maintenance. The service may require that the vehicle be positioned in a certain way or be stationed at a particular location. It may also be necessary to maneuver the vehicle to various locations, such as to different repair bays of the vehicle service facility. Car dollies may be employed to position the vehicle as desired (e.g., to allow for all or part of the vehicle to be suspended above the ground so as to enable a serviceman to more easily access the underside of the vehicle) or to transport the vehicle from one location to another (e.g., after each tire of the vehicle is situated on a separate dolly). In the prior art, one type of dolly may be used to suspend all or part of the vehicle above the ground to allow for a serviceman to perform the necessary repair or maintenance, and another type of dolly, generally referred to in the art as a wheel dolly, may be used to transport the vehicle or a wheel of the vehicle. The present invention is directed to a dolly that, among other things, may be configured to allow for the vehicle or a portion thereof to be suspended for the performance of repair or maintenance, and may also be easily configured as a wheel dolly. "Car" is used herein to refer to a vehicle, such as a truck or a car.

Figure 1:
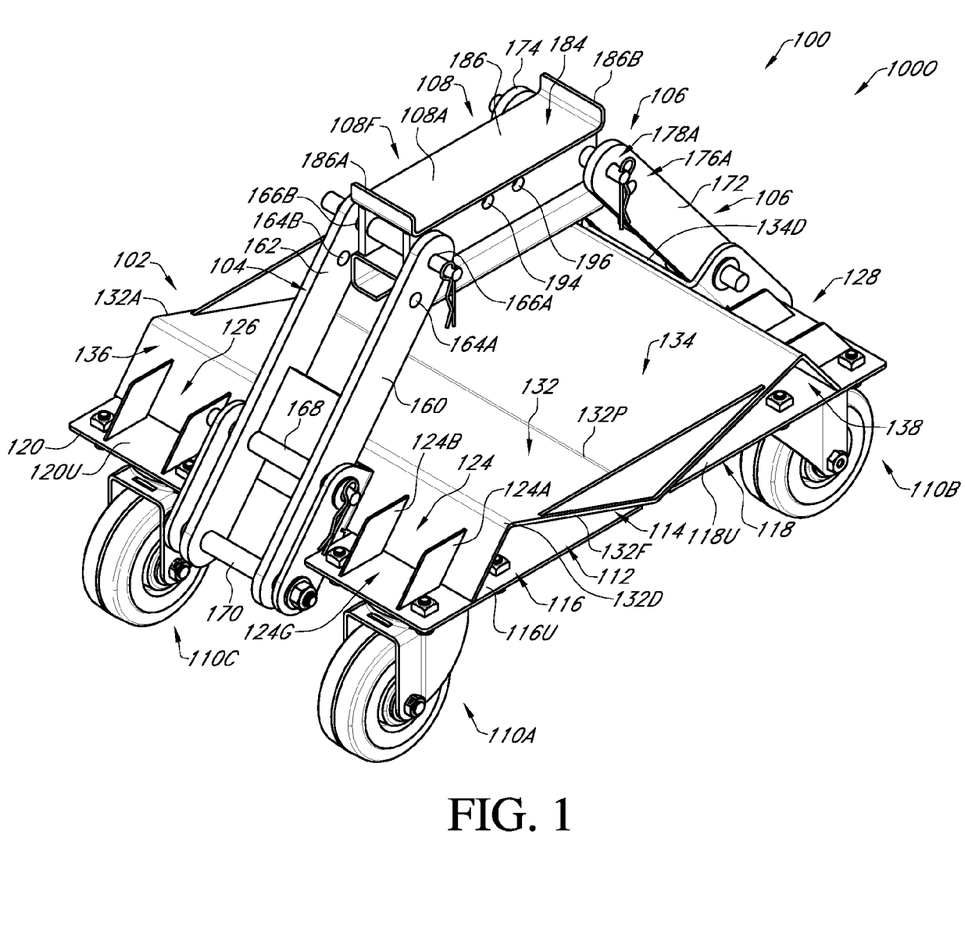
FIG. 1 is a perspective view of a dolly in an extended configuration, with a saddle thereof in a frame rail position, according to an embodiment of the present invention.

Attention is directed to FIG. 1, which shows a dolly 100 in line with the teachings of the present invention. The dolly 100 may have a frame 102, two rotatable arms 104 and 106, a saddle 108, and four wheels 110A, 110B, 110C, and 110D (see FIG. 4A).

Figure 3:
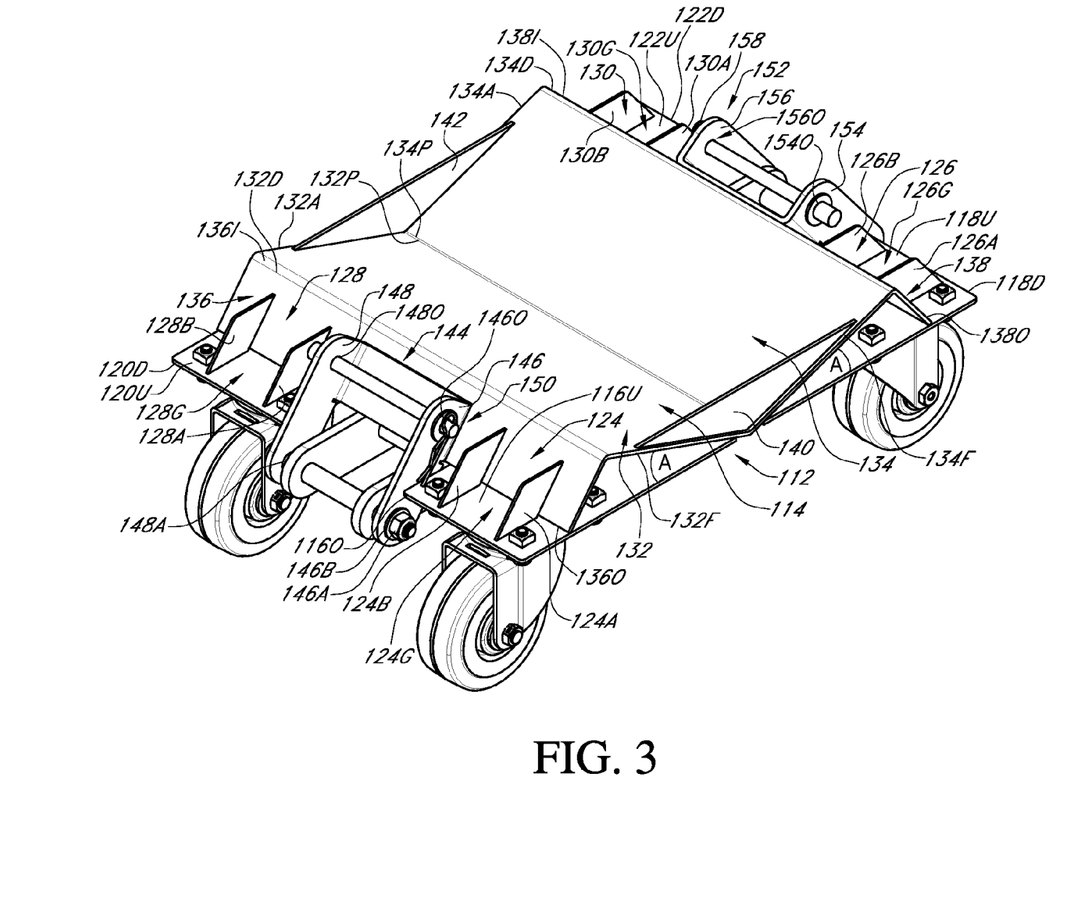
FIG. 3 is a perspective view of the dolly in a retracted configuration.

The frame 102 may have a lower supporting portion 112 (see FIG. 4A) and an upper tire receiving portion 114 (see FIG. 3). The supporting portion 112 of the frame 102 may be generally flat and rectangular, whereas the tire receiving portion 114 may be generally V-shaped or M-shaped. The supporting portion 112 and the tire receiving portion 114 of the frame 102 may be of unitary construction or at least fixed relative to one another.

The supporting portion 112 may be adjacent the floor or other surface on which the dolly 100 is situated. And the supporting portion 112 may, in certain embodiments, comprise four plates 116, 118, 120, and 122 (see FIGS. 4A-4B). The plates 116, 118, 120, and 122 may each be made of steel having a high structural strength, or of other desirable materials. The plates 116, 118, 120, and 122 may be generally identical, and may be generally rectangular. Each plate 116, 118, 120, and 122 may respectively have a lower surface 116L, 118L, 120L, and 122L which faces the floor (see FIGS. 4A-4B), and an upper surface 116U, 118U, 120U, and 122U respectively opposing the lower surface 116L, 118L, 120L, and 122L (see FIG. 3). Each plate 116, 118, 120, and 122 may also respectively have a proximate edge 116P, 118P, 120P, and 122P, a distal edge 116D, 118D, 120D, and 122D, a fore edge 116F, 118F, 120F, and 122F, and an aft edge 116A, 118A, 120A, and 122A (see FIGS. 4A-4B). The aft edge 116A of the plate 116 may face and be adjacent the fore edge 120F of the plate 120, and the aft edge 118A of the plate 118 may face and be adjacent the fore edge 122F of the plate 122. Further, the proximate edge 116P of the plate 116 may face and be adjacent the proximate edge 118P of the plate 118, and the proximate edge 120P of the plate 120 may face and be adjacent the proximate edge 122P of the plate 122.

One wheel 110A, 110B, 110C, and 110D may be respectively mounted to each of the lower surfaces 116L, 118L, 120L, and 122L of the plates 116, 118, 120, and 122. Collectively, the wheels 110A-110D may rollably support the frame 102. The wheels 110A-110D may include suitable support structures. For example, each wheel 110A-110D may be a swivel caster, and the wheels 110A-110D may allow the dolly 100 to be pivoted in any direction as desired for transport. While not expressly shown in the figures, one or more of the wheels 110A-110D may include a brake or other locking mechanism which may be employed to prevent the wheels 110A-110D from rolling inadvertently.

Each of the four plates 116, 118, 120, and 122, at their respective upper surfaces 116U, 118U, 120U, and 122U, may include a wheel storage portion. Specifically, a wheel storage portion 124, 126, 128, and 130 may be provided at the upper surfaces 116U, 118U, 120U, and 122U of the plates 116, 118, 120, and 122, respectively (see FIGS. 1 and 3). The wheel storage portion 124 may comprise two walls 124A and 124B that are adjacent each other and have a gap 124G therebetween. As discussed in more detail herein, the gap 124G may be configured so as to accept and retain a wheel of another dolly 100. The wheel storage portion 124 may be generally identical to the wheel storage portions 126, 128, and 130, each of which may have two adjacent walls 126A and 126B, 128A and 128B, and 130A and 130B having a gap 126G, 128G, and 130G therebetween, respectively. Like the gap 124G, each of the gaps 126G, 128G, and 130G may be configured to accept and retain a wheel of another dolly 100.

The upper tire receiving portion 114 of the frame 102 may comprise two inner walls 132 and 134, and two outer walls 136, and 138 (see FIGS. 1 and 3). Each of these walls 132, 134, 136, and 138 may be angled.

The angled inner wall 132 may have a proximal edge 132P, a distal edge 132D, a fore edge 132F, and an aft edge 132A. The angled inner wall 132, at its underside and at or adjacent its proximal edge 132P, may be secured (e.g., welded or otherwise fastened) to the proximate edges 116P and 120P of the plates 116 and 120, respectively. The angled inner wall 132 may extend from the proximal edge 132P at an angle A up and away from the plates 116 and 120, and may terminate at a distal edge 132D (see FIG. 3). A vertical distance between the proximal edge 132P and the lower supporting portion 112 may thus be less than a vertical distance between the lower supporting portion 112 and the distal edge 132D of the angled inner wall 132. The angle A may be between 5 degrees and 50 degrees, and more preferably, between 10 degrees and 30 degrees.

The angled inner wall 134P may similarly have a proximal edge 134P, a distal edge 134D, a fore edge 134F, and an aft edge 134A (see FIG. 3). The proximal edge 134P of the angled inner wall 134 may be coterminous with the proximal edge 132P of the angled inner wall 132. The angled inner wall 134, at its underside and at or adjacent the proximal edge 134P, may be secured to the proximate edges 118P and 122P of the plates 118 and 122, respectively. Much like the angled inner wall 132, the angled inner wall 134 may extend from the proximal edge 134P at the angle A up and away from the plates 118 and 122, and may terminate at a distal edge 134D. While not required, the angled inner wall 134 may be generally identical to the angled inner wall 132, and the angled inner walls 132 and 134 may be mirror opposites.

In some embodiments, a generally triangular stop wall 140 may be secured (e.g., welded) to the angled inner walls 132 and 134 adjacent their respective fore edges 132F and 134F, and extend vertically therefrom away from the plates 116 and 118. A stop wall 142, which may oppose the stop wall 140, may also be secured to the angled inner walls 132 and 134 adjacent their respective aft edges 132A and 134A, and extend vertically away from the plates 120 and 122. The stop walls 140 and 142 may in some embodiments be generally identical.

The angled outer wall 136 may have an inner edge 136I that is coterminous with the distal edge 132D of the angled inner wall 132. The angled outer wall 136 may extend from the inner edge 136I at an angle towards the lower supporting portion 112 of the frame 102, and terminate at an outer edge 136O. The angled outer wall 136, at its outer edge 136O, may be secured (e.g., welded) to the upper surfaces 116U and 120U of the plates 116 and 120, respectively. As can be seen, the wheel storage portions 124 and 128 may be inwardly adjacent the distal edges 116D and 120D of the plates 116 and 120, respectively, and the outer edge 136O of the angled outer wall 136 may be inwardly adjacent the wheel storage portions 124 and 128.

The angled outer wall 138 (see FIG. 3) may similarly have an inner edge 138I that coincides with the distal edge 134D of the angled inner wall 134. The angled outer wall 138 may extend from the inner edge 138I at an angle towards the lower supporting portion 112 of the frame 102, and terminate at an outer edge 138O. The angled outer wall 138, at its outer edge 138O, may be secured to the upper surfaces 118U and 122U of the plates 118 and 122, respectively. The wheel storage portions 126 and 130 may be inwardly adjacent the distal edges 118D and 122D of the plates 118 and 122, respectively, and the outer edge 138O of the angled outer wall 138 may be inwardly adjacent the wheel storage portions 126 and 130.

A holding portion 144 (see FIG. 3) may be secured to the angled outer wall 136 between the plates 116 and 120 of the supporting portion 112 of the frame 102. The holding portion 144 may have two opposing walls 146 and 148, which may be adjacent the aft edge 116A of the plate 116 and the fore edge 120F of the plate 120, respectively. As can be seen, the holding portion 144 may extend from the angled outer wall 136 beneath the supporting portion 112 of the frame 102. The walls 146 and 148 of the holding portion 144 may each, towards a top side of the holding portion 144, have openings 146O and 148O, respectively. These openings 146O and 148O may be configured to receive a locking member 150. The locking member 150 may, for example, be a clevis pin, a nut and bolt arrangement, or another suitable locking member. Further, the walls 146 and 148 of the holding portion 144 may each, towards a bottom side of the holding portion 144 and underneath the plane formed by the lower supporting portion 112, include corresponding apertures 146A and 148A. The apertures 146A and 148A may be configured to receive a lock 146B, such as nut and bolt arrangement, to allow the arm 104 to be pivotably coupled to the holding portion 144, as discussed in more detail herein.

A holding portion 152 may likewise be secured to the angled outer wall 138 between the plates 118 and 122, adjacent the aft edge 118A of the plate 118 and the fore edge 122F of the plate 122. The holding portion 152 may have two opposing walls 154 and 156, which may be adjacent the aft edge 118A of the plate 118 and the fore edge 122F of the plate 122, respectively. The holding portion 152 may extend from the angled outer wall 138 beneath the supporting portion 112 of the frame 102. The walls 154 and 156 of the holding portion 152 may each, towards a top side of the holding portion 152, have openings 154O and 156O, respectively. Like the openings 146O and 148O, the openings 154O and 156O may be configured to receive a locking member 158, which may for example be a clevis pin. The walls 154 and 156 of the holding portion 152 may each, towards a bottom side of the holding portion 152 and underneath the plane formed by the lower supporting portion 112, include corresponding apertures 154A (see FIG. 5) and 156A (not clearly visible). The apertures 154A and 156A may be configured to receive a lock 152B that may be generally identical to the lock 146B, to allow the arm 106 to be pivotably coupled to the holding portion 152, as discussed in more detail herein. In some embodiments, the holding portions 144 and 152 and the frame 102 may be of unitary construction.

The rotatable arm 104 (see FIG. 1) may comprise two opposing walls 160 and 162. Each wall 160 and 162 may, but need not, be stadium-shaped (i.e., be in the shape of a racetrack oval). The wall 160 may have openings 164A, 166A, and the wall 162 may have openings 164B and 166B that respectively correspond to the openings 164A and 166A. The arm 104 may further have two channels 168 and 170 that each extends between the walls 160 and 162. When the dolly 100 is in an operating (or "extended") position 100O, as shown in FIG. 1, the arm 104 may rest against the angled outer wall 136 and the channel 168 in the arm 104 may correspond to the openings 146O and 148O (see FIG. 3) in the holding portion 144. The locking member 150 may thus be passed through the channel 168 via the opening 146O in the wall 146 and the opening 148O in the wall 148 of the holding portion 144. The locking member 150 may cause the rotatable arm 104 to become locked with respect to the frame 102. As can be seen, in this configuration, the arm 104 may make an acute angle B with the horizontal plane.

Figure 2:
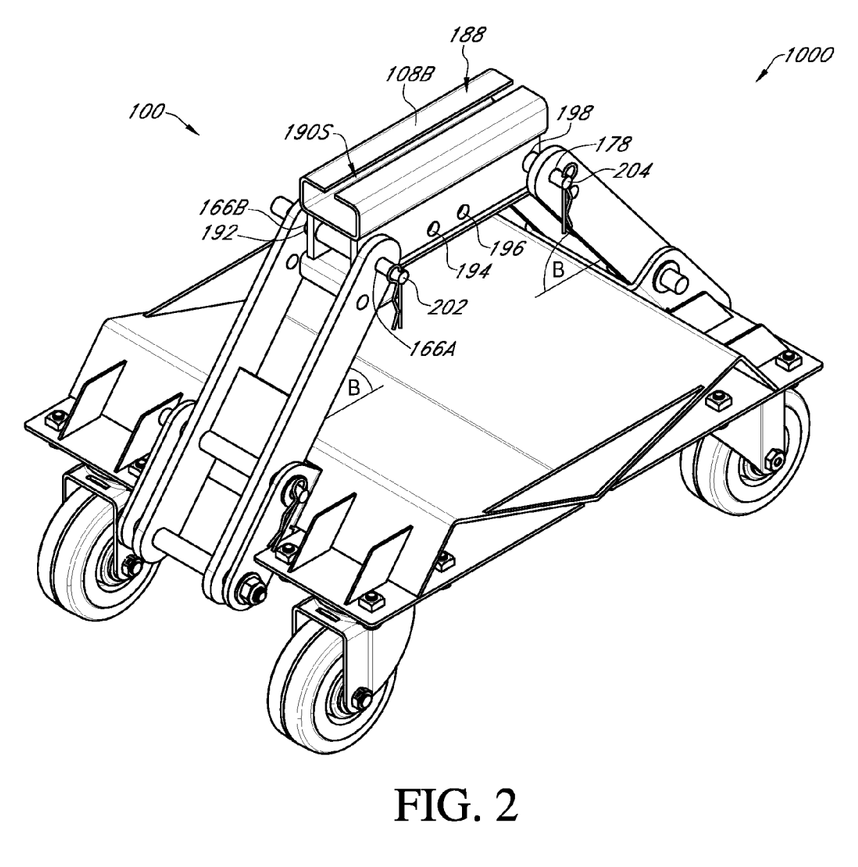
FIG. 2 is a perspective view of the dolly in the extended configuration with the saddle in a pinch weld position.

The rotatable arm 106 may be generally identical to the rotatable arm 104 and may similarly have two opposing walls 172 and 174. The wall 172 may have openings 176A and 178A, and the wall 174 may have openings (not clearly visible) that correspond to the openings 176A and 178A. The arm 106 may further have two channels 180 and 182 (see FIG. 4A) that each extend between the walls 172 and 174. When the dolly 100 is in the operating position 100O, as shown in FIGS. 1 and 2, the arm 106 may rest against the angled outer wall 138 and the channel 180 in the arm 106 may correspond to the openings 154O and 156O (see FIG. 3) in the holding portion 152. The locking member 158 may thus be passed through the channel 180 via the opening 154O in the wall 154 and the opening 156O in the wall 156 of the holding portion 152. The locking member 158 may cause the rotatable arm 106 to be locked with respect to the frame 102. The arm 106, like the arm 104, may make an acute angle with the horizontal when the dolly 100 is in the operating configuration 100O.

The saddle 108 may have a frame rail side 108A (see FIG. 1) and a pinch weld side 108B (see FIG. 2) that opposes the frame rail side 108A. The frame rail side 108A of the saddle 108 may be generally smooth and have a frame rail member 184 that is integral with the saddle 108. The frame rail member 184 may comprise a generally smooth rectangular surface 186 having opposing walls 186A and 186B that extend vertically from the edges of the frame rail member 184. The frame rail member 184 may be configured to fit underneath a frame rail of a vehicle being serviced. Of course, the skilled artisan will understand that the frame rail member 184 may also be used to support other components of a vehicle, such as a suspension arm or parts of the chassis. In some embodiments, the frame rail side 108A may have rubber pads (not shown) to enhance the grip of the saddle 108.

The pinch weld side 108B of the saddle 108 (see FIG. 2) may include a pinch weld member 188. The pinch weld member 188 may be generally rectangular but, unlike the frame rail member 184, may have a slit 190S. The slit 190S may allow the saddle 108 to fit over and accept a pinch weld of the vehicle being serviced.

The saddle 108 may have four channels 192, 194, 196, and 198 that extend through the sides of the saddle 108 (see FIG. 2). Each of these channels 192, 194, 196, and 198 may be configured to accept and retain any one of the locking members 202 and 204, which may, for example, be clevis pins. In the operating configuration, as shown in FIGS. 1 and 2, the locking member 202 may be passed through the channel 192 via the openings 166A and 166B of the arm 104, and the locking member 204 may be passed through the channel 198 via the openings 178A and 178B of the arm 106. In this manner, the saddle 108 may be locked with respect to the frame 102.

If desired, the saddle 108 may be easily removed, rotated 180 degrees, and secured again to the arms 104 and 106. FIG. 1, for example, shows the saddle 108 in a frame rail position 108F, in which the pinch weld side 108B of the saddle 108 faces the frame 102 and the frame rail side 108A of the saddle 108 faces away from the frame 102 and may be used to support the frame rail or other components of the car. The saddle 108 may be placed in a pinch weld position 108P, as shown in FIG. 2, in five easy steps: (1) the clevis pins 202 may be conveniently extracted from the channel 192 of the saddle 108 and the openings 166A and 166B in the arm 104; (2) the clevis pin 204 may be conveniently extracted from the channel 198 of the saddle 108 and the opening 178A (and the corresponding opening, not clearly visible) in the arm 106; (3) the saddle 108 may be rotated 180 degrees across the horizontal plane to cause the pinch weld side 108B to face away from the frame 102; (4) the clevis pin 202 may be reinserted into the channel 192 of the saddle 108 and the corresponding openings 166A, 166B in the arm 104; and (5) the clevis pin 204 may be reinserted into the channel 198 of the saddle 108 and the corresponding openings in the arm 106. In this way, the solitary saddle 108 may be employed with the dolly 100 to effectuate two distinct functions that generally require two separate dolly attachments. The skilled artisan will appreciate that the steps 1 through 5 need not be performed in the order described.

An auto repair shop (or similar establishment) may often be required to service several vehicles at a time, and as such, may carry multiple dollies. Space in auto repair shops may be limited. It may therefore be desirable to stack the multiple dollies while they are not being employed. The dolly 100 allows for such.

Figure 4A:
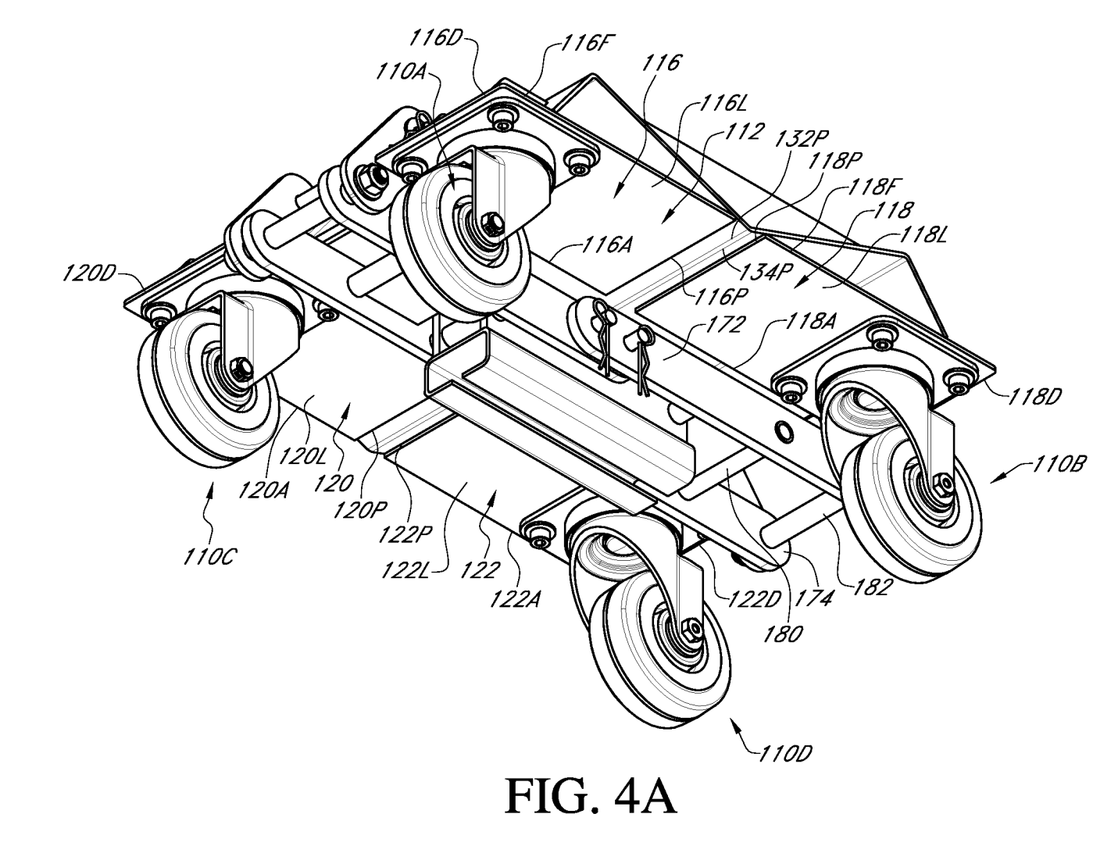
FIGS. 4A and 4B are perspective views of an underside of the dolly in the retracted and the extended configuration, respectively.
Figure 4B:
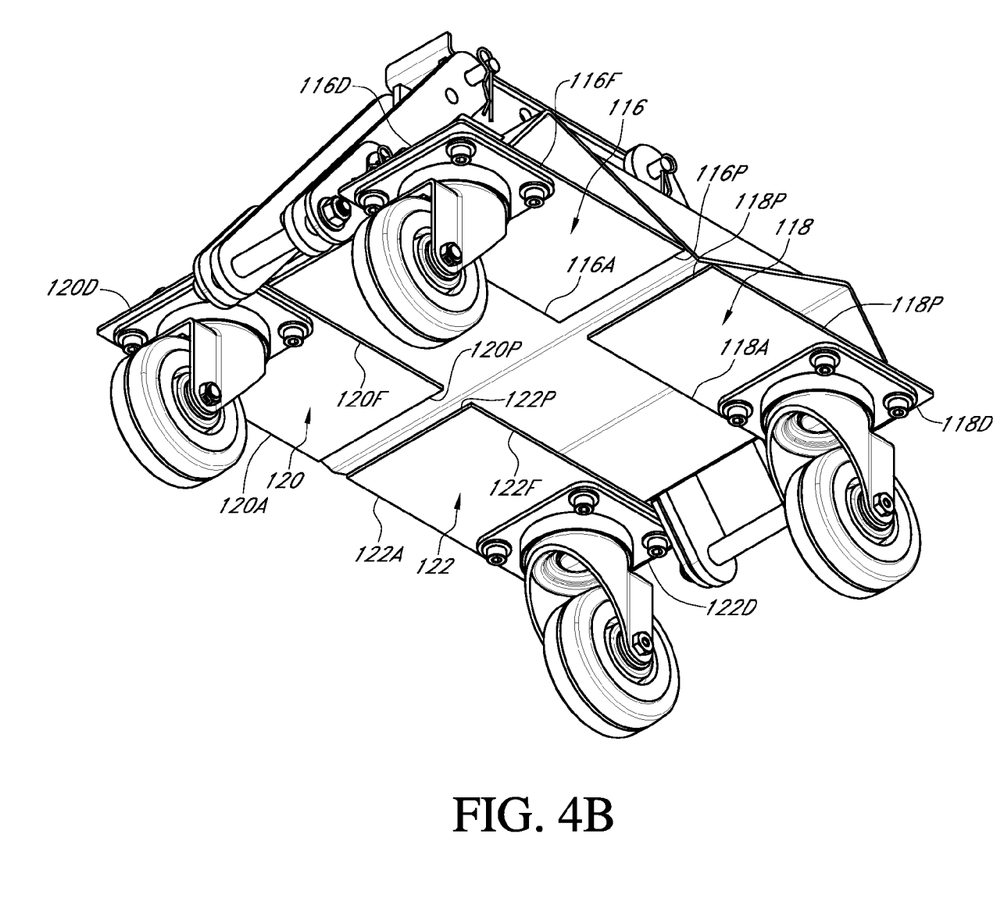
Figure 5:
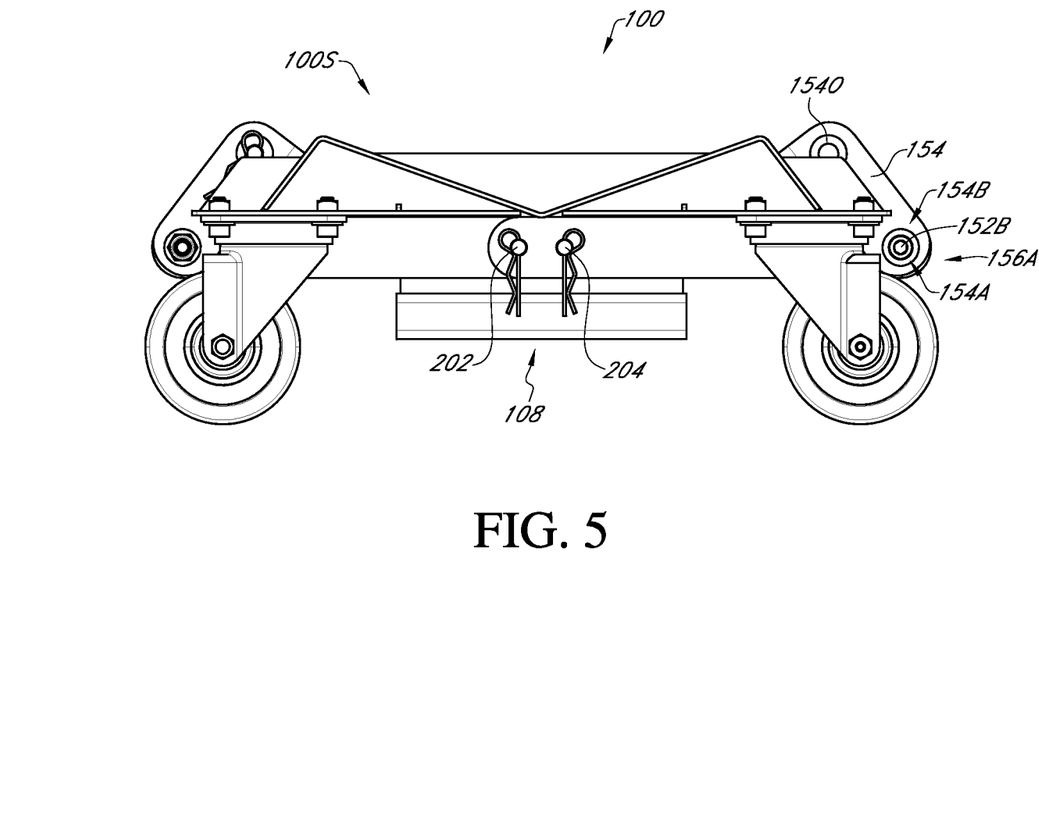
FIG. 5 is a side view of the dolly in the retracted configuration.

FIGS. 3, 4A, and 5 show the dolly 100 in a storage (or "retracted") configuration 100S. The dolly 100 may be quickly and conveniently placed from the operating configuration 100O (irrespective of whether the dolly 100 is in the frame rail position 108F or the pinch weld position 108P) to the storage configuration 100S. To do so, a user may simply: (1) extract the clevis pin 202 from the channel 192 of the saddle 108 and the openings 166A and 166B in the arm 104; (2) extract the clevis pin 204 from the channel 198 of the saddle 108 and the opening 178A (and the corresponding opening, not clearly visible) in the arm 106; (3) extract the clevis pin 150 from the channel 168 of the arm 104 and the openings 146O and 148O in the holding portion 144; (4) extract the clevis pin 158 from the channel 180 of the arm 106 and the openings 154O and 156O in the holding portion 152; (5) rotate the arm 104 counterclockwise (i.e., cause the arm 104 to pivot at the lock 146B) such that it is downwardly adjacent the lower supporting portion 112 of the frame 102 (see FIG. 4A) and extends generally horizontally underneath the frame 102; (6) rotate the arm 106 counterclockwise (i.e., cause the arm 106 to pivot at the lock 152B) such that it is downwardly adjacent the lower supporting portion 112 of the frame 102 and extends generally horizontally, so as to cause the openings 178A and 176A in the arm 106 to respectively correspond to the openings 164A and 166A in the arm 104; (7) pass the clevis pin 202 through each of the openings 178A (and its corresponding opening in the wall 174) of the arm 106, the openings 164A and 164B in the arm 104, and the channel 194 in the saddle 108, which all vertically align with each other in the storage configuration 100S; and (8) pass the clevis pin 204 through each of the openings 176A (and its corresponding opening in the wall 174) of the arm 106, the openings 166A and 166B in the arm 104, and the channel 196 in the saddle 108, each of which are in vertical alignment in the storage configuration 100S. It will be appreciated that these steps, which need not be performed in the order described, may be completed within a few seconds (e.g., thirty seconds). The lock 150, as shown in FIG. 3, may be passed through the openings 146O and 148O in the holding portion 144 for storage. Similarly, the lock 158 and may be passed through the openings 154O and 156O in the holding portion 154 for storage.

In the storage configuration 100S, the saddle 108, as shown in FIG. 5, is upwardly adjacent the ground and not in contact therewith. Thus, the movement of the dolly 100 is not restricted. The dolly 100 may be able to function in this storage configuration 100S as a wheel dolly. That is, with the arms 104 and 106 tucked underneath the frame 102, the tire receiving portion 114 (and specifically, the angled inner walls 132 and 134) may be employed to transport a tire of the vehicle, for example. Alternatively, one dolly 100 may be placed beneath each of the four tires of a vehicle, which may allow for the vehicle to be conveniently transported via the dollies 100. The stop walls 140 and 142 may help ensure that the tire (or another object) being transported via the dolly 100 does not fall off the sides of the tire receiving portion 114.

Figure 6:
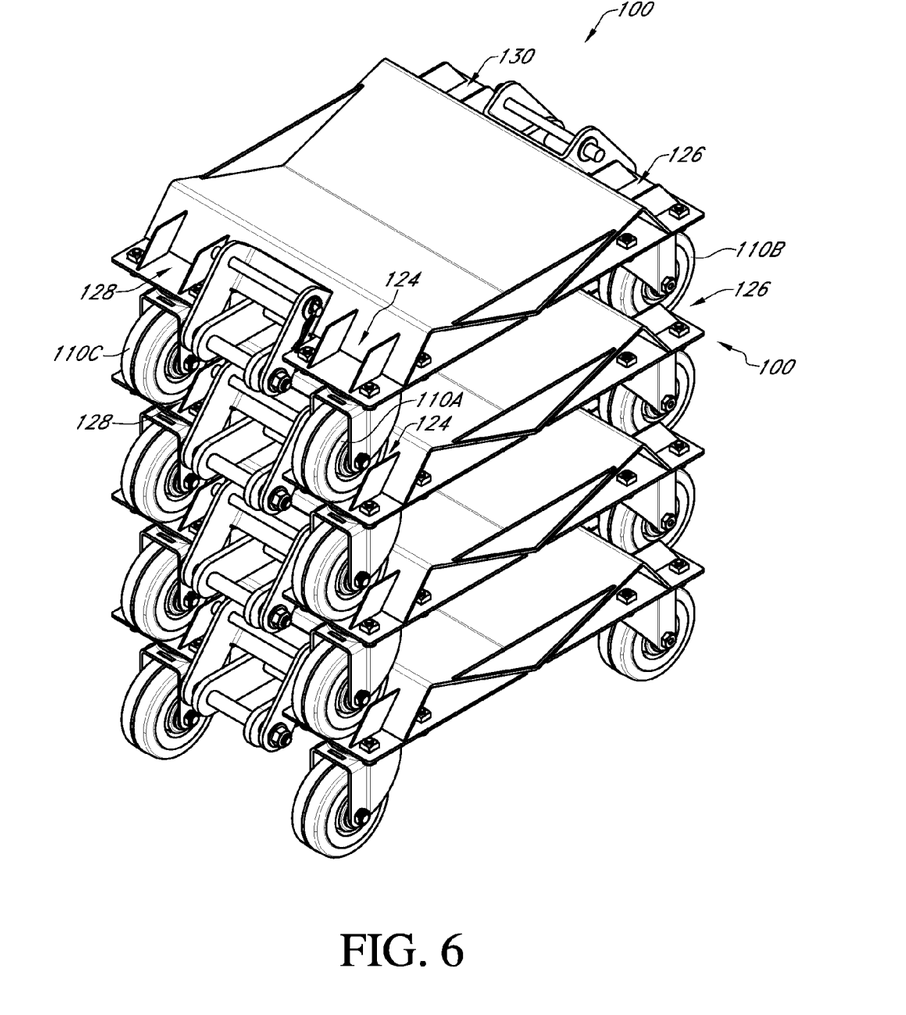
FIG. 6 is a perspective view the dolly of FIG. 1 stacked atop other dollies, according to an embodiment.

The storage configuration 108S, in addition to allowing the dolly 100 to function as a wheel dolly, may allow for stacking of the dollies 100 to conserve space. Specifically, as shown in FIG. 6, a dolly 100 in the storage configuration 100S may be stacked atop another dolly 100, and several dollies 100 may be so stacked. To do so, the user may simply place one dolly 100 atop another dolly 100 such that the wheels 110A-110D of one dolly 100 fit in the wheel storage portions 124, 126, 128, and 130 of the other dolly 100, respectively. Such functionality may advantageously dispense with the need for carts that are often used to transport multiple dollies from one location to another.

Thus, as has been described, the dolly 100 may be quite versatile, and because of its unique construction, may be used in the performance of several functions that heretofore were performed using separate dollies.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A stackable car dolly, comprising:
    a frame having a supporting portion and a tire receiving portion; the supporting portion supporting the tire receiving portion and having a plurality of wheel acceptance areas; the tire receiving portion comprising a pair of angled inner walls and a pair of outer walls;
    a pair of rotatable arms; and
    a reversible saddle having a frame rail member and a pinch weld member opposing the frame rail member;
    wherein, in an extended configuration, each rotatable arm extends above the frame at an angle; and
    wherein, in a retracted configuration, each rotatable arm extends underneath the frame.

2. The stackable car dolly of claim 1, further comprising a pair of holding portions; each holding portion being adjacent one of said pair of outer walls.

3. The stackable car dolly of claim 1, wherein the supporting portion comprises four rectangular plates.

4. The stackable car dolly of claim 1, wherein the saddle is removably coupled to each rotatable arm with at least one locking member.

5. The stackable car dolly of claim 4, wherein the locking member is a clevis pin.

6. The stackable car dolly of claim 1, wherein the saddle has two outer channels and two inner channels; each channel being configured for the passage of a locking member.

7. The stackable car dolly of claim 1, further comprising four casters secured to the supporting portion.

8. A method of placing a dolly from an extended position to a retracted position, the method comprising steps:
    providing the dolly, the dolly comprising:
        a frame having a supporting portion and a tire receiving portion;
        a first rotatable arm and a second rotatable arm;
        a first holding portion and a second holding portion; the first rotatable arm being pivotably connected to the first holding portion; the second rotatable arm being pivotably connected to the second holding portion; and
        a reversible saddle;
    uncoupling each of the first rotatable arm and the second rotatable arm from the saddle;
    causing each of the first rotatable arm and the second rotatable arm to rotate underneath the frame; and
    using at least one locking member to lock with respect to the frame each of the first rotatable arm, the second rotatable arm, and the saddle.

9. The method of claim 8, wherein at least one said locking member is a clevis pin.

10. The method of claim 9, further comprising the step of stacking the dolly atop another dolly.

11. The method of claim 8, further comprising the step of stacking the dolly atop another dolly.

12. The method of claim 8, wherein the tire receiving portion further comprises stop walls.

13. The method of claim 8, wherein the saddle has a pinch weld member and a frame rail member.

14. The method of claim 13 wherein, in the retracted configuration, the pinch weld member faces away from the frame.

15. A car dolly, comprising:
    a frame having a supporting portion and a tire receiving portion; the supporting portion having a plurality of wheel acceptance areas; the tire receiving portion comprising a pair of angled inner walls and a pair of outer walls;
a pair of rotatable arms; and
a reversible saddle;
wherein, in an extended configuration, each rotatable arm extends above the frame at an angle; and
wherein, in a retracted configuration, each rotatable arm extends generally horizontally underneath the frame.

16. The car dolly of claim 15, wherein the saddle has a frame rail member and a pinch weld member opposing the frame rail member.

17. The car dolly of claim 15, further comprising a pair of holding portions, each of said pair or rotatable arms being pivotally coupled to one of said pair of holding portions.

18. The car dolly of claim 15, wherein the tire receiving portion is M-shaped.

19. The car dolly of claim 15, wherein a plurality of channels extend through each of said pair of rotatable arms.

20. The car dolly of claim 15, wherein each wheel acceptance area comprises two walls having a gap therebetween.

\* \* \* \* \*